Figure 4:
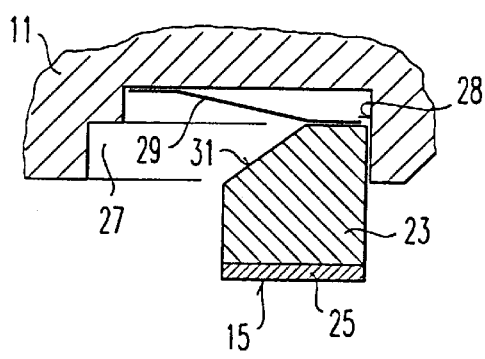

United States Patent
Marx et al.

[11] Patent Number: 5,927,684
[45] Date of Patent: Jul. 27, 1999

[54] SLIDE, PARTICULARLY PIPE BRIDGE SLIDE

[75] Inventors: Norbert Marx, Düren; Günter Nägler, Eschweiler, both of Germany

[73] Assignee: Zimmerman & Jansen GmbH, Duren, Germany

[21] Appl. No.: 08/819,920

[22] Filed: Mar. 18, 1997

[30] Foreign Application Priority Data

Oct. 23, 1996 [DE] Germany ............ 196 44 135
Nov. 13, 1996 [DE] Germany ............ 196 46 908

[51] Int. Cl.$^6$ ............................................. F16K 25/00
[52] U.S. Cl. ......................... 251/203; 251/195; 277/618
[58] Field of Search ........................... 277/602, 608, 277/616, 618, 627, 927, 938, 379, 377, 500, 385; 251/157, 170, 194, 195, 196, 327, 328, 203

[56] References Cited

U.S. PATENT DOCUMENTS

| | | | |
|---|---|---|---|
| 3,013,769 | 12/1961 | Volpin | 251/327 X |
| 3,293,342 | 12/1966 | Grove | 251/327 X |
| 4,286,614 | 9/1981 | Kacal et al. | 137/72 |
| 4,320,890 | 3/1982 | Meyer et al. | 251/196 X |
| 5,366,199 | 11/1994 | Isoyama | 251/328 X |

*Primary Examiner*—Lynne Reichard
*Assistant Examiner*—Greg Binda
*Attorney, Agent, or Firm*—Alston & Bird LLP

[57] ABSTRACT

Single-plate slide, especially single-plate pipe bridge slide (10) with a slide-plate (16) and if necessary a pipe bridge (20), which is or are movable by means of an actuating device (18, 19) within this casing (11) in order to close or open a fluid passage (17) formed in a casing (11), the slide plate (16) or pipe bridge (20) having lateral seal surfaces which correspond with seal surfaces located on the casing side, especially annular seal surfaces (14, 15). At least one of the seal surfaces (14, 15) on the casing side forms part of a seal ring (23) located in the casing (11), which abuts with resilient pre-stressing on the facing seal surface of the slide plate (16) or pipe bridge (20).

3 Claims, 5 Drawing Sheets

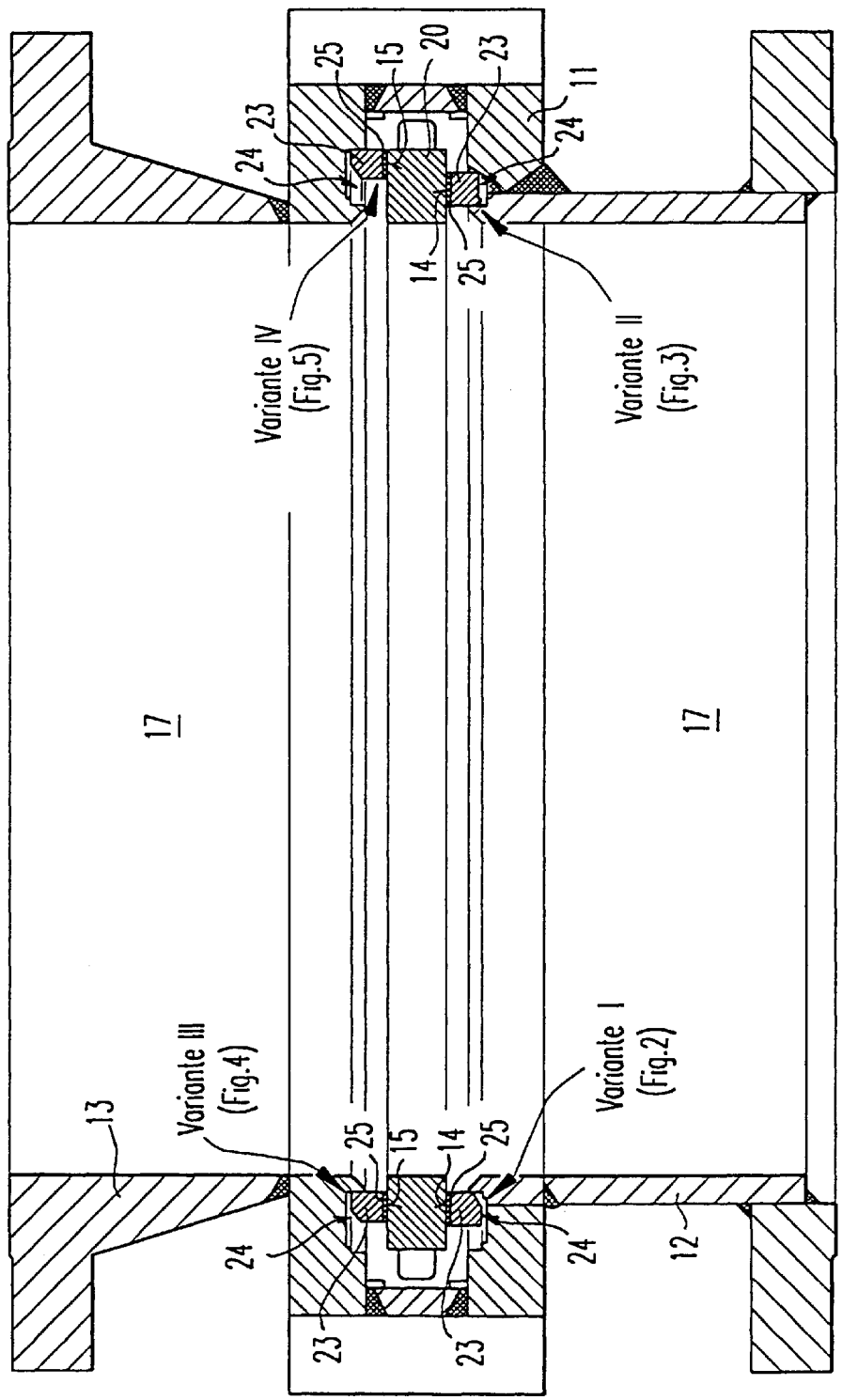

SLIDE, PARTICULARLY PIPE BRIDGE SLIDE

SPECIFICATION

The invention relates to a slide, particularly a pipe bridge slide, according to the preamble of claim 1.

Slides of this type are generally known and have been manufactured and sold by the applicant for years (see Prospectus No. 300, II/82 of the applicant with the title "Armaturen und Einrichtungen for Prozesse in Raffinerien, Petrochemie, Chemie-Programm III"; DE-U-80 08 316 or the document EP-B-0 450 646 also originating from the applicant). Pipe bridge slides as flat, oval and round slides, are known both in the form of single-plate slides and also in the form of double-plate slides (wedge-in-wedge principle), and in effect with an ascending spindle and a straight tubular passage in the open position. The present case relates to the further development of the seal between the slide plate or pipe bridge on the one hand and the casing on the other hand. The abovenamed seal is of particular importance is so-called pipe bridge slides. Such slides are used when, in the open position of the slide, sealing of its passage area or fluid passage from the rest of the internal space of the casing and thus from the outer environment is required. This is particularly the case when there is a fluid or gas flow with impurities consisting of subliming materials, because these will otherwise be deposited on unenclosed portions of the casing and can lead to total blockage and thus to prevention of actuation of the slide. Such slides are used in particular for transporting gases containing dust, but also severely adulterated fluid media, e.g. in coal gasification systems, combustion systems, chemical systems, pipelines or the like.

A double-plate slide is known from DE-C-868 543, whose pipe bridge is composed of a resilient corrugated pipe with slide and seal rings located on the end face. The pipe bridge is accommodated in a tubular casing portion of the slide plate, which serves simultaneously for securing and guiding the pipe bridge. In the open position of the slide, the slide rings are pressed against the casing seal seats by the elasticity of the corrugated pipe and by the spreading effect of a wedge device. This known construction has the disadvantage that, in order to obtain a sufficiently efficient seal, the pre-stress on the resilient corrugated pipe must be set relatively high. The consequence is that upon displacement of the pipe bridge, its seal rings slide with a relatively high pressure along the opposite seal seats of the slide casing. The result is considerable friction between the contacting seal surfaces, so that considerable actuating forces are necessary in order to switch over the slide. In order to avoid these disadvantages, it is proposed in DE-U-80 08 316 to suspend the seal rings of the pipe bridge on an extension of the actuating rod for the slide plate and to provide them with a return device, these having rollers attached to the seal rings, which run on actuating strips attached in the casing with lead-in grooves for the rollers in the region of the slide passage. This combined spreading and release device is intended on the one hand to ensure a reliable pressure of the seal rings in the open position of the slide and on the other hand to ensure free mobility of the pipe bridge along the two casing seal seats when the slide is actuated. It is also proposed to provide the closure plates of the slide plates with rollers which, in the closed position, run into the lead-in grooves of the actuating strips in order, particularly when there are high differential pressures, to enable displacement of the closure plates with the minimum friction and without damage to the seal surfaces. In concrete terms, the pipe bridge is composed of two seal rings and a compensator connecting the seal rings together. The seal rings are of such dimensions that their diameter coincides with that of the casing seal seats. The compensator comprises a resilient, undulatingly curved sheet-metal ring, which is incorporated in such a way that deposits of dust are automatically thrown off when the compensator is compressed or expanded. In the open position of the slide, the seal rings are spread apart by means of a wedge device, which in fact has in the slide casing stationary and laterally-disposed casing parts which, in the open position of the slide, co-operate respectively with two plate wedges located on the seal rings. The pipe bridge further has a return device with four respective rollers, which are attached laterally and in pairs to the seal rings, symmetrically to their central axis. The rollers run on four actuating strips attached in the slide casing, which are provided in the region of the slide passage with lead-in grooves for the rollers. The closure plates also have four respective rollers, which run on the abovenamed actuating strips. The clearance between the actuating strips and the groove depth of the lead-in grooves is so dimensioned that, in the closed position or in the open position of the slide, both the closure plates and the seal rings of the pipe bridge are pressed by the inner wedge or the casing wedges in a gas-tight manner against the casing seal seats, while outwith these two switching positions, they are guided at a distance from the casing seal seats. The abovenamed description of the known construction shows that what is involved is a relatively complex construction. Many individual components must be co-ordinated with one another, with regard to the sequence of movements. When manufacturing the known double-plate slide with pipe bridge, therefore, the highest precision is required. Furthermore, the known construction contains a plurality of parts exposed to wear, and parts which require separate cleaning after a predetermined period of use. A particular disadvantage is the described mechanical automatic control of the seal rings of the pipe bridge in relation to the seal seats of the slide casing.

The double-plate slide construction of the applicant according to EP-B-0 450 646 represents a considerable simplification in comparison. This construction is also however characterised by a pipe bridge which has two seal rings interconnected by a compensator.

The object underlying the present invention is to provide optimum seal conditions in so-called single-plate slides, particularly single-plate pipe bridge slides.

This object is achieved according to the invention by the characterising features of claim 1, preferred alternative and constructive further developments being described in the sub-claims.

Thus, according to the invention, at least one seal surface on the casing side is resiliently pre-stressed, this seal surface forming part of a seal ring disposed in the casing. According to claim 6, the seal according to the invention preferably involves a metallic seal. Accordingly, the seal surface formed on the seal ring is a correspondingly-machined surface, particularly machined by grinding and polishing, of an armouring on the side of the seal ring facing the slide plate or pipe bridge.

The resilient pre-stress of the at least one seal ring is preferably formed by a spring ring disposed between casing and seal ring, particularly in the manner of a disc spring or of a corrugated plate ring. The spring ring is preferably so designed according to claim 3 that it bears in a fluid-sealing manner on the casing on the one hand, and on the side of the seal ring lying opposite the seal surface on the other hand.

In this way, by means of the spring ring, i.e. by means of the resilient pre-stressing means of the associated seal ring, a fluid seal is produced between the fluid passage and the interior of the casing or the external environment. The resilient pre-stressing means thus has a double function, i.e. resilient pre-stressing of the seal ring on the one hand and the function of a fluid seal on the other hand.

In another embodiment, in which the at least one seal ring is resiliently pre-stressed by pressure members distributed uniformly over the circumference, a separate fluid seal is necessary in the region between the fluid passage and the slide plate or pipe bridge, as shown in claims 10 and 11. This embodiment however has the advantage that instead of a mechanical pre-stressing, pneumatic and/or hydraulic pre-stressing can also be selected.

Finally the embodiment according to claims 12 to 14 should be noted, which is characterised in that the seal rings consist of soft resilient material. In order to avoid damage to these seal rings, they are preceded, seen in the direction from radially inwards to radially outwards, by respective wiper rings of hard metal, which strip off caked deposits or the like accumulations on the slide plate and/or pipe bridge when these components are actuated, so that the soft resilient seal rings cannot be damaged in this way.

In order to provide a fluid seal between the fluid passage and the interior of the casing or the external environment, both the seal rings and the wiper rings are supported on the casing side via soft resilient flat seals, which preferably comprise paper and/or textile material. Graphite material is also conceivable for this purpose.

The essential feature in the present invention is thus that a seal construction is involved for a single-plate slide arrangement, particularly a single-plate pipe bridge slide, the respective seal surfaces being metallic. At least one seal surface, particularly the seal surface on the casing side, is resiliently pre-stressed in order to ensure the necessary sealing effect.

The embodiment according to claim 7 is particularly advantageous for repairs, as it permits compensation of tolerances both in the axial and in the radial direction. This compensation of tolerances with a simultaneous sealing function in the axial and radial directions is ensured by the annular wedge provided according to claim 7, which according to claim 8 preferably consists of graphite material.

Figure 6:
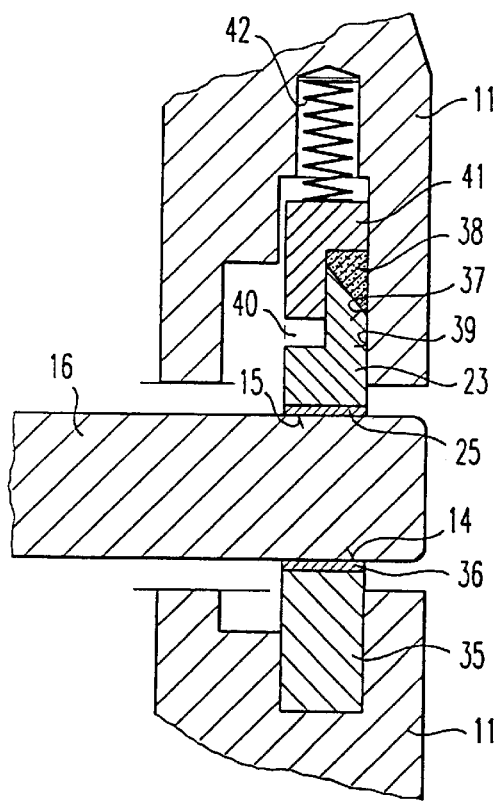
Figure 7:
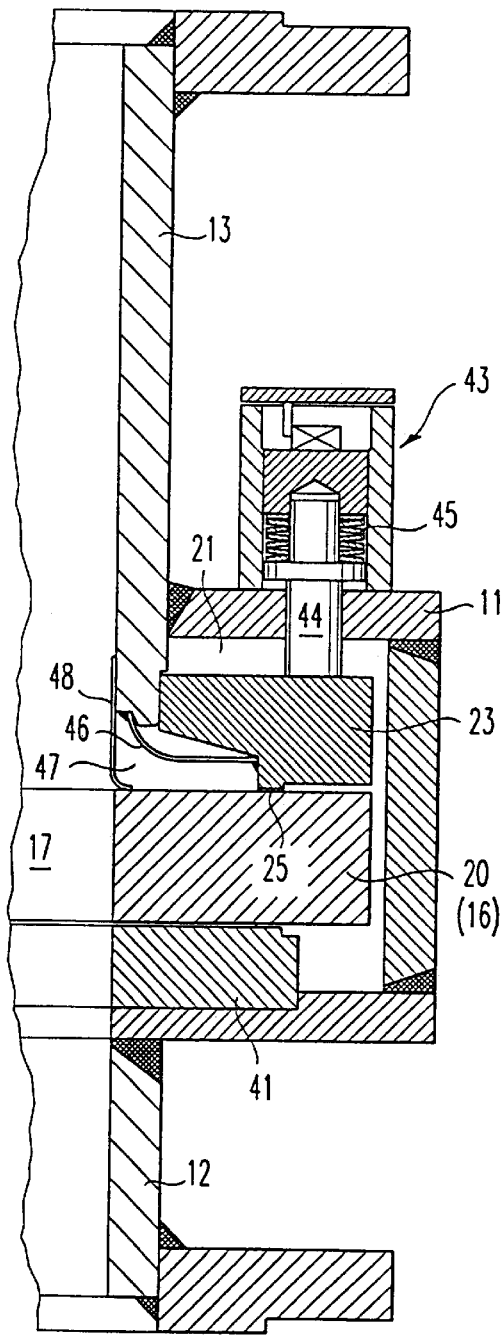
Figure 8:
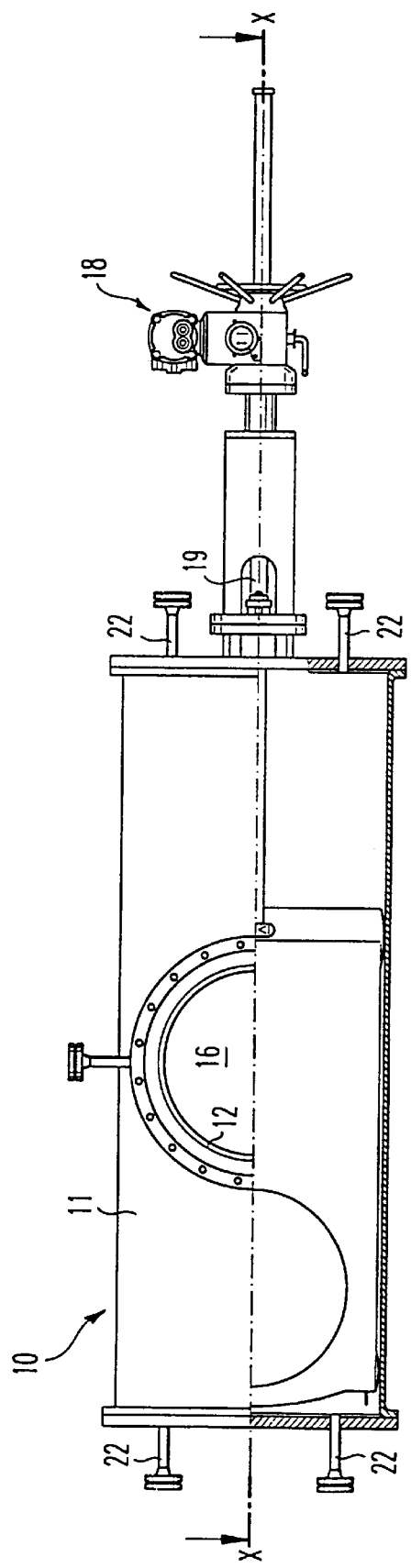
Figure 9:
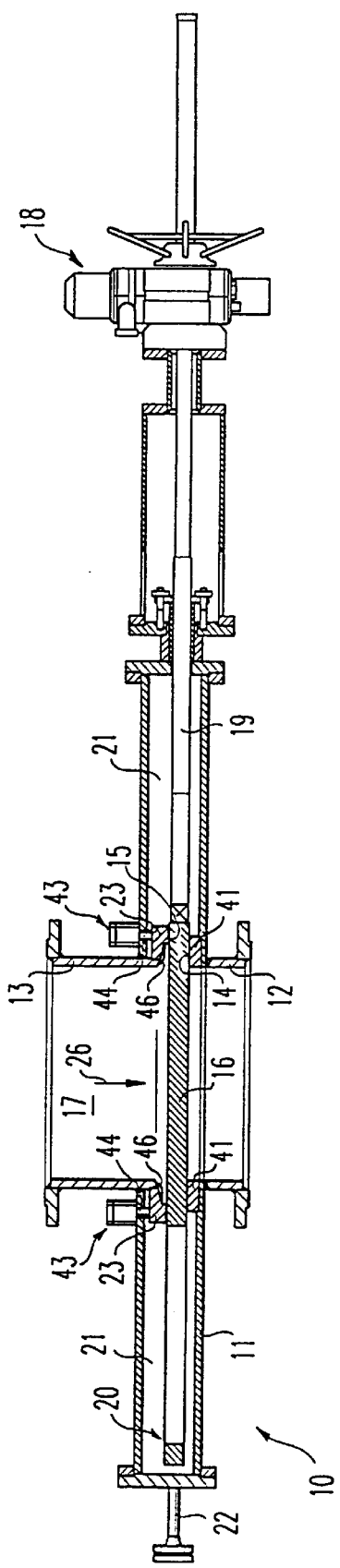

Embodiments of slides designed according to the invention are explained in the following in more detail with reference to the annexed drawings, which show:

FIG. 1: a single-plate pipe bridge slide showing the pipe bridge in cross-section, four variants of a metallic casing seal being shown;

FIGS. 2 to 5: the four variants of casing seals shown only schematically in FIG. 1, on an enlarged scale;

FIG. 6: a portion of a second embodiment of a metallic casing seal in cross-section, this casing seal being particularly suitable for repair purposes;

FIG. 7: a third embodiment of a metallic and resiliently pre-stressed casing seal in cross-section and on an enlarged scale;

FIGS. 8 and 9: a single-plate pipe bridge slide in partial view and in cross-section along lines X—X in FIG. 8, showing the range of application of the casing seals according to the invention.

In order to provide better understanding of the casing seals described in the following, firstly the basic construction of a single-plate pipe bridge slide is shown with reference to FIGS. 8 and 9. This single-plate pipe bridge slide 10 accordingly has a slide casing 11 with two pipe nozzles 12 and 13 and two casing seal seats or seal surfaces 14 and 15, between which a slide plate 16 can be moved to and fro, i.e. perpendicular to the fluid passage 17 in the casing 11 defined by the pipe nozzles 12 and 13. The slide plate 16 is actuated by means of a drive system 18 not shown in more detail here, which is connected via an actuating rod 19 with the slide plate. In the direct vicinity of the slide plate 16 there is formed a so-called pipe bridge 20. In the concrete case, the pipe bridge is formed by a corresponding bore in the slide plate 16. The pipe bridge 20, in the open position of the slide, likewise co-operates with the seal surfaces 14 and 15 on the casing side. In FIG. 9, the slide is in the closed position. The fluid passage 17 is blocked by the slide plate 16. If the slide plate 16 is moved to the right in FIG. 9, the pipe bridge 20 passes into the region of the fluid passage 17 and releases it. The slide casing is designed to be fluid-tight towards the exterior, so that there can be produced, within the slide casing or in the interior 21 thereof, a gas pressure which is preferably greater than the pressure in the fluid passage 17. Accordingly the actuating rod 19 must be introduced into the slide casing 11 in fluid-tight manner.

In order to produce the necessary gas pressure within the casing 11, the latter is provided with gas connections 22, through which so-called rinsing gas for cleaning the casing cavity can also be blown in and removed again.

It should be noted at this point that the casing seal as shown in FIG. 9 is again explained in more detail with reference to FIG. 7. Accordingly, FIG. 9 shows a preferred embodiment of a casing seal according to the invention. All the further embodiments however are similarly suitable for the single-plate pipe bridge slide construction according to FIGS. 8 and 9. Accordingly FIGS. 8 and 9 also serve to illustrate the purpose of the casing seals described in more detail later, and where they are located.

There will now be a more detailed explanation, with reference to the first embodiments of preferred casing seals in FIGS. 1 to 5, FIG. 1 showing again part of a single-plate pipe bridge slide as already explained with reference to FIGS. 8 and 9. These parts will no longer be separately mentioned with reference to FIG. 1.

FIG. 1 contains four embodiments of resiliently pre-stressed casing seals in association with a pipe bridge 20, the association with the slide plate 16 being effected similarly, as FIG. 8 shows.

A factor common to all four variants is that the seal surface 14 or 15 on the casing side is a part of a seal ring 23 located in the casing 11, which can be pressed under resilient pre-stress against the facing seal surface of the slide plate 16 or in FIG. 1 pipe bridge 20. The seal surface 14 or 15 formed on the seal ring 23 is furthermore a correspondingly processed surface, particularly a surface machined by grinding and polishing, of an armouring 25 on the side of the seal ring 23 facing the slide plate 16 or pipe bridge 20.

The resilient pre-stressing of the seal ring or seal rings 23 is shown in FIG. 1 with the reference number 24 located above. The resilient pre-stressing 24 acts axially, i.e. in a direction parallel to the flow direction of the fluid through the fluid passage 17. In FIG. 9, the flow direction of the fluid through the fluid passage 17 is shown by the arrow 26.

The mentioned four variants of a metallic casing seal will now be explained in more detail with reference to FIGS. 2 to 5, it being pointed out at this stage that it is sufficient if one of the casing seals active on both sides of the slide plate or pipe bridge is resiliently pre-stressed. Preferably, the casing seal active on the pressure side of the slide plate is resiliently pre-stressed. The opposite casing seal is stationary in design or location. The resiliently pre-stressed casing seal will be explained in more detail in the following. The casing seal according to FIG. 2 comprises a surrounding seal ring, which is axially movably mounted within an annular groove 27. It abuts on the radially inwardly located limit 28 of the annular groove 27. The axial pre-stressing of the seal ring 23 against the slide plate or pipe bridge is effected by a spring ring 29, which is active between the seal ring 23 and the casing 11, the spring ring 29 being positioned within a receiving groove 30 on the base of the groove 27 accommodating the seal ring 23. The spring ring 29 is formed after the fashion of a disc spring. It is however so formed that it abuts in a fluid-sealing manner on the side of the seal ring 23 lying opposite the seal surface 14 on the one hand, and on the base of the receiving groove 30 on the other hand. It is preferably surface-machined on its contacting surfaces.

On the side facing the radially inward limit 28, the seal ring 23 is provided with a chamfer 31, which ensures automatic centering of the seal ring 23.

Instead of the disc spring ring shown, a corrugated plate ring or the like spring ring may be provided. It need only be ensured that the seal ring 23 is resiliently pre-stressed by the spring element in an axial direction against the slide plate or pipe bridge.

Figure 2:
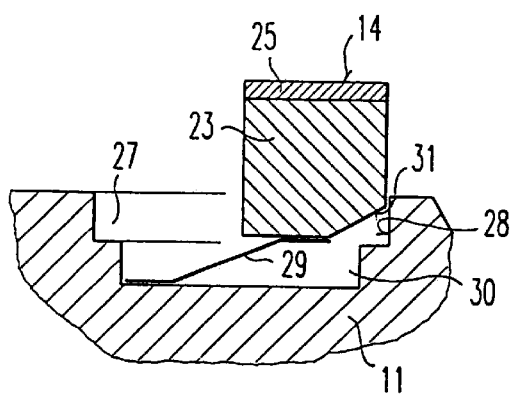
Figure 3:
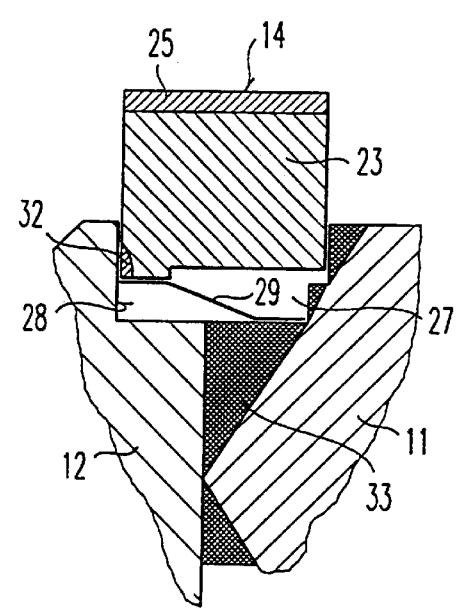

The embodiment according to FIG. 3 shows the variant II and differs from variant I according to FIG. 2 substantially in that there is provided on the inner corner, on the casing side, of the seal ring 23, a separate annular seal 32, which co-operates with the radially inner limit 28 of the casing groove 27. Moreover, the casing groove 27 is machined out in the region of the weld connection between pipe nozzle 12 and casing 11 in order to receive the seal ring 23. The corresponding weld seam is identified by reference number 33 in FIG. 3.

The spring ring used in the embodiment in FIG. 3 corresponds to that in FIG. 2. The contact surfaces of the spring ring 29 on the seal ring 23 on the one hand and on the base of the casing groove 27 on the other hand may here also be separately machined for purposes of improved fluid seal. It has become apparent in practice however that such an additional machining is as a rule unnecessary.

The variant III shown in FIG. 4 differs from the variant I shown in FIG. 2 only in that the chamfer 31 lies radially outwards. In this way the spring ring 29 can extend close up to the radially inward limit 28 of the casing groove 27. The axial pre-stressing is thus applied in the embodiment in FIG. 4 in the direct vicinity of the radially inward limit 28 of the casing groove 27 on the seal ring 23, while in the embodiment in FIG. 2 the axial pre-stressing is substantially centrally applied to the seal ring 23.

Figure 5:
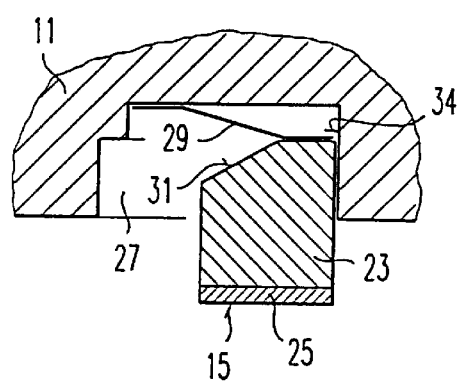

The embodiment in FIG. 5 shows a fourth variant in which the seal ring 23 abuts slidingly on the radially outward limit 34 of the casing groove 27. Accordingly the spring ring 29 also extends close up to the radially outward limit 34 of the casing groove 27 and acts in a correspondingly radially outwardly off-set way on the seal ring 23.

As already stated above, the casing seal seat can be resiliently pre-stressed on both sides of the slide plate or pipe bridge. However as a rule it is sufficient if only one of the two casing seal seats is resiliently pre-stressed.

The degree of resilient pre-stressing can be adjusted by corresponding selection of a resilient sheet metal ring or spring ring 29.

By means of the casing seals described, a permanent, resilient metallic seal can be achieved under all conceivable operational conditions.

The spring ring 29 has the additional advantage that it compensates for all manufacturing tolerances and thermal and mechanical deformation processes. The seal action is not impaired by such tolerances or deformations.

FIG. 6 shows a partial section through a slide plate 16 and through the casing seals associated with this slide plate 16, the casing seal lying on the pressure side being resiliently pre-stressed in an axial direction against the slide plate 16 or against a seal surface formed on the edge thereof. The casing seal located opposite is stationary. It comprises a seal ring 35 located in the slide casing 11, the side of said seal ring 35 facing the slide plate 16 being provided with armouring 36. This armouring 36 is ground and polished on the slide plate side, forming a corresponding casing seal surface 14.

The casing seal located on the pressure side comprises a resiliently pre-stressed seal ring 23 with armouring 25 and casing seal surface 15 which is machined just like the casing seal surface 14 of the seal ring 35 fixed to the casing. On its side facing away from the slide plate 16 of pipe bridge 20, the resiliently pre-stressed seal ring 23 has an annular surrounding wedge surface 37, against which the resiliently pre-stressed annular wedge 38 may be pressed, the annular wedge 38 being supported on the wedge surface 37 of the seal ring 23 on the one hand, and on a surrounding annular wall, in this case the radially outward limit 39, of an annular groove 40 in the casing 11 accommodating the seal ring 23, in such a way that the casing is sealed at the same time. Thus the annular wedge has both the function of a casing seal and also the function of compensating measurement tolerances. The annular wedge 38 is acted upon by a pressure ring 41 which is L-shaped in cross-section, and which is pre-stressed by a compression spring 42. A plurality of compression springs 42, uniformly distributed over the circumference, are provided, which pre-stress the compression ring 41 uniformly over the circumference.

The pressure ring 41 likewise has a basic cross-section which is L-shaped. The seal ring 23 and compression ring 41 are placed within the casing groove 40 in such a way that their cross-sections are off-set to one another through 180°.

This embodiment is particularly suitable for subsequent incorporation of resiliently pre-stressed casing seals or for repairs as, due to the annular wedge 38 mentioned, tolerances both in the radial and in the axial direction can be compensated.

The resilient pre-stressed casing seal according to FIG. 6 is above all used when a soft seal located within the casing groove 40 is to be replaced, e.g. because of wear on the same.

It should be noted that the annular wedge 38 preferably consists of graphite or the like heat-resistant seal material, which is also slidable and deformable resiliently within certain limits. Ceramics are also conceivable instead of graphite as a material for the annular wedge 38.

Preferably, the wedge surfaces facing one another of annular wedge 38 and seal ring 23 have a different cone in such a way that the resilient pre-stressing presses the annular wedge 38 securely against the tube passage.

The compression springs 42 are so dimensioned that they are capable of pressing the slide plate 16 towards the casing 11 in a sealed manner against the existing pressure.

In the embodiment according to FIG. 7, the seal ring 23 located on the pressure side is resiliently pre-stressed by at least three pressure sockets 43 uniformly distributed over the circumference, with a pressure member, particularly a pressure bolt 44, bearing respectively on a side of the seal ring facing away from the slide plate 16 or pipe bridge 20 with resilient pre-stressing. Resilient pre-stressing is effected by disc springs 45 located within the pressure sockets. The resilient pre-stressing of the seal ring 23 can be effected by hydraulic or pneumatic means.

On the side facing the fluid passage 17 in casing 11, there is provided between the resiliently pre-stressed seal ring 23 and casing 11 or fluid passage an annular compensator 46, in the form of a compensator plate welded at one end to the seal ring 23 and to the fluid passage or to the pipe nozzle 13 defining the fluid passage 17 at the other end over the circumference of the same. The compensator plate comprises a concavity extending over the circumference and directed towards the fluid passage 17. The annular compensator 46 so formed provides a seal between the fluid passage and the casing 11 or the interior of the casing 21. At the same time the annular compensator 46 permits axial mobility of the seal ring 23.

So that the annular compensator can be active largely uninfluenced by fluid pressure in the fluid passage 17, the side of the annular compensator facing the fluid passage 17 is closed off from the fluid passage 17, and in the present case by a sheet metal ring 48 bridging over an annular gap 47 between pipe nozzle 13 and slide plate 16 or pipe bridge 20, said sheet metal ring 48 abutting on the facing side of the slide plate 16 or pipe bridge 20 in the manner of a wiper ring. This sheet metal ring 48 also prevents the fluid pressure from becoming fully active on the annular compensator 46, with the consequence that then the fluid pressure would act contrary to the resilient pre-stressing of the disc springs 45.

All the features disclosed in the application documents are claimed as essential to the invention, insofar as, individually or in combination, they are new in comparison to prior art.

We claim:

1. A valve adjustable between an open position and a closed position with respect to a fluid passage therethrough, said fluid passage defining a flow axis, said valve comprising:

a casing having at least one annular groove formed therein, the annular groove having a surface generally coaxial with the flow axis;

a slide plate disposed within said casing and having lateral seal surfaces aligned perpendicular to said flow axis;

a seal ring disposed within said annular groove and having a seal surface facing said lateral seal surfaces of said slide plate, wherein said seal ring is axially movable with respect to the annular groove therein disposed and has an annularly surrounding wedge surface facing away from said seal surface;

a spring disposed within said annular groove accommodating said axially movable seal ring, said spring for resiliently pre-stressing said at least one axially movable seal ring; and an annular wedge interposed between said spring and said axially movable seal ring and defining a wedge surface corresponding to said wedge surface of said seal ring, wherein said spring and said annular wedge cooperate to resiliently pre-stress said axially movable seal ring thereby urging contact between the annular seal surface thereon and at least one lateral seal surface of said slide plate, and further wherein said spring cooperates with said annularly surrounding wedge surface to urge said annular wedge in a radial direction into contact with said surface of said annular groove, forming a seal therebetween.

2. A valve according to claim 1 wherein said annular wedge is composed of a resiliently deformable, heat resistant and slidable material.

3. A valve according to claim 1 wherein said annular wedge is composed of graphite.

* * * * *

UNITED STATES PATENT AND TRADEMARK OFFICE
CERTIFICATE OF CORRECTION

PATENT NO. : 5,927,684
DATED : July 27, 1999
INVENTOR(S) : Marx et al.

It is certified that error appears in the above-identified patent and that said Letters Patent is hereby corrected as shown below:

On the title page, [73] Assignee, in the assignee's name, "Zimmerman & Jansen GmbH" should read --Zimmermann & Jansen GmbH--.

Signed and Sealed this

Fourteenth Day of December, 1999

Attest:

Q. TODD DICKINSON

Attesting Officer

Acting Commissioner of Patents and Trademarks